W. J. YEOELL.
PRINTING PLATE MATRIX AND METHOD OF MAKING THE SAME.
APPLICATION FILED APR. 25, 1916.
1,379,431.
Patented May 24, 1921.
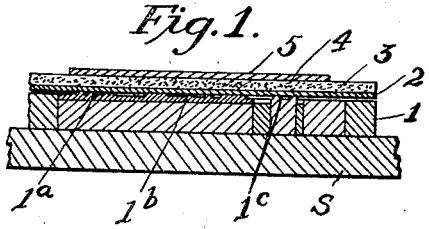
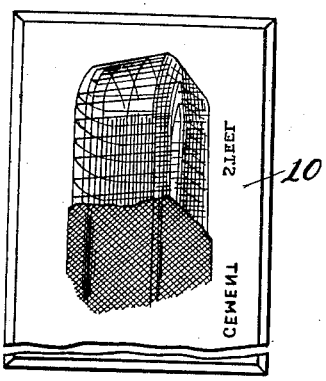
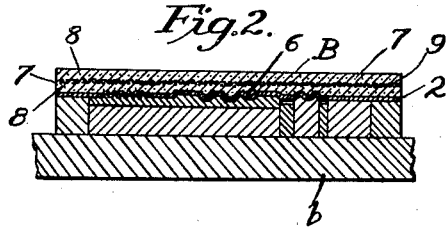
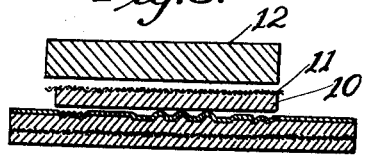
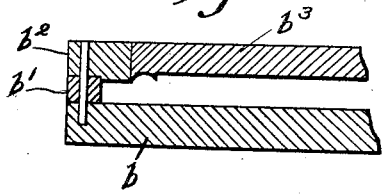
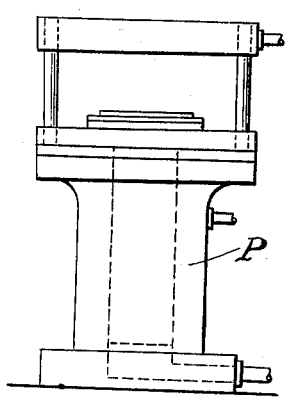
Inventor
William J. Yeoell
By his Attorneys
Meyers, Cavanagh & Hyde

UNITED STATES PATENT OFFICE.

WILLIAM J. YEOELL, OF PHILADELPHIA, PENNSYLVANIA, ASSIGNOR TO JOHN STOGDELL STOKES, OF PHILADELPHIA, PENNSYLVANIA.

PRINTING-PLATE MATRIX AND METHOD OF MAKING THE SAME.

1,379,431. Specification of Letters Patent. Patented May 24, 1921.

Application filed April 25, 1916. Serial No. 93,493.

*To all whom it may concern:*

Be it known that I, WILLIAM J. YEOELL, of Philadelphia, Pennsylvania, have invented certain Improvements in Printing-Plate Matrices and Methods of Making the Same, of which the following description, in connection with the accompanying drawings, is a specification, like characters on the drawings designating like parts.

This invention relates to the art of printing, and in the present instance is directed to matrices for making molded printing plates and to the method of producing such matrices, and is in the nature of an improvement upon the invention originally disclosed in my prior application, Serial No. 784,456, filed August 12, 1913, and which last mentioned invention now forms the subject matter of my application filed Dec. 2, 1920, Serial No. 427,833, as a division of said prior application 784,456.

In said earlier application Serial No. 784,456, as originally filed, I set forth the use of a synthetic resinous material, in the nature of phenolic condensation products, in the manufacture of articles such as molded printing plates and their matrices. Therefore such claims as relate to matrix structures and to the method of making the same and are generic to the present application and to the aforesaid divisional application of this original case 784,456 are incorporated in said last mentioned divisional application, while the claims herein are directed to improvements upon the invention originally disclosed in said earlier application, Serial No. 784,456 and now forming the subject matter of the division of the latter.

In practising the present invention I make the matrix from the composite structure disclosed herein and which includes, as a component, a synthetic resin in the nature of a phenolic condensation product such as that commercially termed redmanol. As is well known, such a phenolic condensation product, when subjected to a predetermined degree of heat, or heat and pressure, will assume a hard and set and substantially infusible form. Consequently my improved composite matrix structure, when made with a phenolic condensation product as a constituent, will embody the desired features of strength, durability, lightness of weight, and resistance to acids, printing pressures, and the wear and tear encountered in handling and transportation.

Furthermore in the preparation of the composite structures from which my matrices may be made, I employ in conjunction with the phenolic condensation product, strengthening and stiffening fillers or sheets of various sorts in the nature of fibrous material such as felt or paper, or fabrics such as crinoline, coarse linen or the like. These fillers or strengthening and stiffening sheets may be incorporated in a laminated structure, and employed as a backing for the metallic molding face of the matrix, as shown in the drawings and as hereinafter described.

It is also my purpose to provide an improved method by which my composite matrix structures may be manufactured by a simple molding operation at a great saving of time, labor and cost when compared with the preparation of electrotypes, sterotypes, and similar metal plates.

Furthermore, by the practice of my method, and the utilization of the materials herein set forth, the matrices may be molded so as to accurately reproduce the finest details of an original, such as a type body, etching or the like, or an original printing body made up of a combination of type, half-tone and etching.

With the above recited objects and others of a similar nature in view, my invention consists in the construction, combination and arrangement of parts, and in the improved method, set forth in and falling within the scope of the appended claims.

In the accompanying drawings:

Figure 1 is a cross sectional view showing an original type form and a matrix face sheet imposed thereon in preparation for a preliminary step in the making of the matrix, Fig. 2 is a cross sectional view showing the matrix at a later stage in its formation with the metallic face sheet rolled into the type form and a composite backing imposed upon the face sheet, Fig. 3 is a cross sectional view illustrating the matrix and showing printing plate blanks ready to be operated upon in the formation of a printing plate, Fig. 4 is a plan view of a molded printing plate which may be made with my matrix, Fig. 5 shows the molded printing plate of Fig. 4 as mounted upon a wooden base or block, Fig. 6 is a cross sectional view illustrating a portion of a form of molding box which may be used in making the matrix, Fig. 7 is a view in elevation of a conventional form of press which may be used for pressing or molding the matrix and also the printing plate.

Referring now to the accompanying drawing, and particularly to Fig. 1, the numeral 1 indicates, as an entirety, an original type form which is to be reproduced, and as illustrated herein comprises a plate having half-tone matter $1^a$, and line matter $1^b$ in composition with type $1^c$, as I am enabled to reproduce these various printing elements in a single molded matrix, and consequently to subsequently reproduce the same in a unitary printing plate.

Upon this type form I impose a thin metallic sheet 2 of suitable thickness, and possessing the requisite tenacity and flexibility, as the metallic sheet should be capable of being rolled in upon the original type form without rupturing upon the type, half-tone dots, lines or other characters. If desired a plurality of sheets 2 may be rolled in at the same time, being superimposed upon each other.

In the preliminary treatment of the metal sheet 2, which is of a thin foil-like structure, I impose upon the sheet a blanket 3 of fibrous material preferably treated with or having incorporated therein a sharpening medium 4, and having imposed thereon a definition producing layer 5, all as set forth in my earlier Patent No. 782,184, dated February 7, 1905 and for the purposes therein stated. The parts thus assembled are subjected to pressure through a suitable agent, such as an ordinary roll press, so that the metal sheet 2 will be rolled into the face of the type form, and the rolling operation may be repeated, if necessary, until the metal sheet 2 is swaged or rolled uniformly into the interstices between the type characters and will exhibit the concavely rounded interstitial web portion 6 shown in Fig. 2, and as described in my patent aforesaid.

The metal face sheet 2 is now ready for backing to complete the matrix. To accomplish this, after the blanket 3 and the pressure sheet 5 have been removed, I impose upon the exposed surface or back of the sheet 2 a composite blank B of suitable material. In the present instance this blank includes layers of a phenolic condensation product such as redmanol shown at 7, having incorporated therein a suitable filler such as wood-flour or the like indicated at 8 in Fig. 2, and also having a filler or stiffening layer 9 of fiber, such as the fabric known as crinoline, and also indicated in said Fig. 2. As heretofore stated I may use fillers of various kinds, as for example the utilization of such heat conducting substances as powdered metal or metallic oxides to increase the heat conductivity of the plastic material or phenolic condensation product; also felting fibers, fabric or paper to strengthen and stiffen the molds and also coarse linen and similar fabrics for a similar purpose.

This blank B and the form 1, with the metal sheet 2 interposed, are pressed together, preferably under a degree of heat and pressure sufficient to convert the phenolic condensation product into a hard permanent form to provide a matrix capable of being used in the manufacture of the molded printing plate. I have found a suitable pressure to range from 1000 to 3000 pounds, applied for about 5 to 20 minutes, and with a temperature ranging from 200 to 430 degrees Fahrenheit, according to the character of the work.

Any suitable apparatus may be used for molding the matrix, one convenient form being that described in my above mentioned prior application, Serial No. 784,456.

In Fig. 6 I have illustrated, somewhat conventionally, and in cross section, a molding box, shown more in detail in said earlier application, 784,456, and which may be used in the molding of the matrix, under heat and pressure, as well as in making the printing plate from the matrix. Briefly this molding box, a portion of which is shown in Fig. 6, comprises a base $b$, side frames $b^1$ $b^2$ and a top or plunger $b^3$, and if desired the matrix may be molded in this box, when placed in the press conventionally shown at P in Fig. 7.

In Fig. 1 the parts, preparatory to rolling in the metal face sheet 2 are shown as mounted upon a supporting base S, while in Fig. 2 the letter $b$ indicates the base of the molding box, the sides and top being omitted.

When the matrix has been subjected to heat and pressure, in the press P, after the manner described in said earlier application 784,456, it may be removed and will appear as shown in Fig. 3, in cross section, with a metal molding face imposed upon a laminated back consisting of layers of hard or baked phenolic condensation product and the intermediate fibrous layer.

This matrix, as shown in Fig. 3 may be used in molding a printing plate by imposing upon the metal face a sheet of phenolic condensation product shown at 10, backed with a layer 11 of fabric, which in turn has a backing block 12 imposed thereon. The plate is molded in the press, under heat and pressure, in substantially the manner already described for molding the matrix, and when completed will appear substantially as shown in Figs. 4 and 5, after it has been trimmed. As the printing plate itself, and the method of making the same, form the subject matter of a divisional application, filed December 2, 1920, Serial No. 427,831, it need not be described in detail.

While I have herein shown and described the preferred form of my invention, I wish it to be understood that I do not confine myself to all the precise details of construction herein set forth by way of illustration, as modification and variation may be made without departing from the spirit of the invention or exceeding the scope of the appended claims.

What I claim is:

1. A matrix comprising a body portion, including a layer of fibrous material and a layer of hard and set synthetic resin imposed upon the fibrous layer, and a metallic molding face imposed upon the layer of synthetic resin.

2. A matrix comprising a laminated body portion, including a plurality of layers of hard and set synthetic resin and a layer of fibrous material interposed between the layers of synthetic resin, and a metallic molding face imposed upon one of the layers of synthetic resin.

3. A matrix comprising a body portion, including a layer of fibrous material and a layer of hard and set synthetic resin imposed upon the fibrous layer, and a molding face of sheet metal imposed upon and united with the layer of synthetic resin.

4. A matrix comprising a body portion including a layer of fibrous material, a layer of hard and set phenolic condensation product imposed upon the fibrous layer, and a molding face of sheet metal imposed upon and united with the layer of phenolic condensation product.

5. A matrix comprising a layer of hard and set synthetic resin having a filler incorporated therein, a layer of fibrous material united with one side of the layer of synthetic resin, and a metallic molding face imposed upon the opposite side of the layer of synthetic resin.

6. The herein described method of forming a matrix which comprises imposing a metallic sheet upon an original body to be reproduced, subjecting said sheet to pressure to form therein depression and elevations complemental to the depressions and elevations of the original, then preparing a backing sheet composed of a layer of fibrous material and a layer of synthetic resin, then imposing said backing sheet upon the metallic face sheet with the layer of synthetic resin in contact with said face sheet, and then subjecting the parts to heat and pressure to cause the synthetic resin of the backing sheet to harden and set.

7. A composite sheet including a layer of fibrous material, a layer of synthetic resinous material imposed upon the fibrous layer, and a layer of metallic material imposed on the resinous material.

8. A composite sheet including a layer of fibrous material, a superposed layer comprising a synthetic resinous material and a sheet metal facing imposed on the resinous material and permanently united thereto.

Signed at Philadelphia, in the county of Philadelphia and State of Pennsylvania, this fifth day of April, 1916.

WILLIAM J. YEOELL.